United States Patent [19]

Badger

[11] Patent Number: 4,908,282
[45] Date of Patent: Mar. 13, 1990

[54] RECOMBINANT BATTERY AND PLATE SEPARATOR THEREFOR

[75] Inventor: John P. Badger, Genoa, Ohio

[73] Assignee: Hollingsworth and Vose Company, East Walpole, Mass.

[21] Appl. No.: 261,700

[22] PCT Filed: Nov. 12, 1987

[86] PCT No.: PCT/US87/02941

§ 371 Date: Jul. 11, 1988

§ 102(e) Date: Jul. 11, 1988

[87] PCT Pub. No.: WO88/03710

PCT Pub. Date: May 19, 1988

[51] Int. Cl.$^4$ .............................................. H01M 2/16
[52] U.S. Cl. ........................................ 429/59; 429/73; 429/251; 429/252; 29/623.1
[58] Field of Search ................... 429/59, 73, 176, 251, 429/252; 29/623.1

[56] References Cited

U.S. PATENT DOCUMENTS

| | | | |
|---|---|---|---|
| 3,532,557 | 10/1970 | Sasagawa | 429/161 X |
| 3,862,861 | 1/1975 | McClelland et al. | 136/26 |
| 4,216,280 | 8/1980 | Kono et al. | 429/252 |
| 4,245,013 | 1/1981 | Clegg et al. | 429/147 X |
| 4,359,511 | 11/1982 | Strzempko | 429/139 X |
| 4,367,271 | 1/1983 | Hasegawa et al. | 162/146 X |
| 4,526,677 | 7/1985 | Bodendorf | 429/252 |

Primary Examiner—Stephen J. Kalafut
Attorney, Agent, or Firm—John C. Purdue; David C. Purdue

[57] ABSTRACT

A fibrous sheet useful as a battery plate separator is disclosed. The sheet, in a specific embodiment, is made from a mixture of Grade 210 glass fibers, Grade 206 glass fibers, Grade A-20 chopped glass strand, and Grade A-121 polyethylene fibers. The fine glass fibers impart a high absorbency to the sheet; the coarse glass fibers impart a lower absorbency; and the polyethylene fibers, which are hydrophobic, are essentially non-absorbent. The different fibers are used in such proportions that the sheet has the absorbency, usually from 75 to 95 percent, required for use in a recombinant battery, even in the presence of free electrolyte.

A recombinant battery in which fibrous sheets as described above serve as plate separators is also disclosed, as is a method for producing a recombinant battery which includes the steps of assembling a plurality of electrodes with such sheet separators in a case, flooding the electrodes in the case with an electrolyte, removing electrolyte that is not absorbed by the sheet separators from the case, and closing the case.

Finally, a recombinant battery in a case which has an opening is also disclosed; the opening is closed by a thin film of polyethylene or the like through which hydrogen can escape at a faster rate than oxygen.

15 Claims, 2 Drawing Sheets

RECOMBINANT BATTERY AND PLATE SEPARATOR THEREFOR

BACKGROUND OF THE INVENTION

Field of the Invention

This invention is a recombinant battery wherein oxygen formed electrolytically at the positive plates inside the battery is able to migrate to the negative plates for electrolytic recombination, a plate separator for such a battery, and a method for producing such a battery. Briefly, the plate separator is made from fibers having different capabilities for holding electrolyte; the fibers are used in such proportions that the separator, even in the presence of excess electrolyte, is capable of holding only the amount of electrolyte desired in the battery. The fibers having different capabilities for holding electrolyte can be, for example, coarse glass fibers and fine glass fibers or a mixture of glass fibers and polypropylene fibers.

Definitions

Subsequently herein, the term "percent v/v" means percent by volume; the term "percent w/w" means percent by weight; all temperatures are in °C.; and the following abbreviations have the meanings indicated: $\mu$m means micrometer or micrometers (numerically equal to micron or microns); mg=milligram or milligrams; g=gram or grams; kg=kilogram or kilograms; l=liter or liters; ml=milliliter or milliliters; and cm=centimeter or centimeters.

The Prior Art

Recombinant batteries have been known for a number of years, being disclosed, for example, in U.S. Pat. No. 3,362,861, McClelland et al. This patent also discloses such batteries having vent valves through which gases which form in service can escape to prevent the build-up of an excessive internal pressure. U.S. Pat. No. 3,159,508, Chreitzberg, discloses a battery including a container designed to prevent an undue build-up of hydrogen pressure. According to the patent, the container is made from a material which exhibits substantially increased permeability to hydrogen without a corresponding increase in permeability to oxygen.

Recombinant battery plate separators made from glass fibers of a plurality of diameters and made from mixtures of glass fibers and polypropylene fibers are also known. For example, U.S. Pat. No. 4,465,748, Harris, discloses glass fiber sheet material for use as a separator in an electrochemical cell, e.g., in such a battery, and made from 5 to 35 percent by weight of glass fibers less than 1 $\mu$m in diameter; the patent also discloses a glass fiber sheet for such use wherein there are fibers of a continuous range of fiber diameters and lengths, and most of the fibers are not over 5 mm in length. U.S. Pat. No. 4,216,280, Kono et al., discloses glass fiber sheet material for use as a plate separator in such a battery, and made from 50 to 95 percent by weight of glass fibers less than 1 $\mu$m in diameter and 50 to 5 percent by weight of coarser glass fibers. The coarser glass fibers, the reference says, have a fiber diameter larger than 5 $\mu$m, preferably larger than 10 $\mu$m, and it is advantageous for some of the coarser fibers to have diameters of 10 $\mu$m to 30 $\mu$m. U.S. Pat. No. 4,373,015, Peters et al., discloses sheet material for use as a separator in such a battery, and "comprising organic polymeric fibers"; both of the examples of the reference describe the sheet material as "short staple fiber polyester matting about 0.3 mm thick", and indicate that the polyester fibers range from about 1 $\mu$m to about 6 $\mu$m in diameter. Finally, sheet separators for use in conventional (non-recombinant) batteries and comprising both glass fibers and organic fibers are disclosed in all of the following U.S. Pat. Nos. 4,529,677, Bodendorf; 4,363,856, Waterhouse; and 4,359,511, Strzempko. U.S. Pat. No. 4,367,271, Hasegawa, discloses storage battery separators composed of acrylic fibrils in an amount of up to about 10 percent by weight, balance glass fibers. Japanese patent document No. 55/146872 discloses a separator material comprising glass fibers (50-85 percent by weight) and organic fibers (50-15 percent by weight). U.S. Pat. No. 4,245,013, Clegg et al., discloses a separator made by overlaying a first sheet of fibrous material including polyethylene fibers with a second sheet of fibrous material including polyethylene and having a synthetic pulp content higher than the first sheet. So far as is known, there has not heretofore been a suggestion of a plate separator which, when saturated with electrolyte, leaves a residuum of unfilled voids through which a gas can transfer from one plate to another because the separator is not capable of holding an amount of electrolyte which is sufficient to fill all the voids.

SUMMARY OF THE INVENTION

Briefly, the instant invention is a fibrous sheet useful as a battery plate separator. The sheet consists essentially of first and second fibers, both of which are inert to a particular aqueous electrolyte. The first fibers impart to the sheet a given absorbency greater than 90 percent relative to the particular electrolyte, when surfactant-free, while the second fibers impart to the sheet a different absorbency less than 80 percent relative to the electrolyte, when surfactant-free. The first and second fibers are present in the sheet in such proportions that the sheet has an absorbency with respect to that electrolyte, when surfactant-free, of from 75 to 95 percent. Preferably the first fibers are glass fibers, most desirably glass fibers having an average diameter less than 5 $\mu$m. In one preferred embodiment the second fibers are organic fibers that are hydrophobic relative to the electrolyte, when surfactant-free, most desirably polyethylene or polypropylene fibers. In another preferred embodiment the second fibers are coarse glass fibers, for example, having a diameter from 10 $\mu$m to 20 $\mu$m. In a third preferred embodiment there are both organic fibers that are hydrophobic relative to the electrolyte, when surfactant-free, and large diameter glass fibers, in addition to glass fibers having an average diameter less than 5 $\mu$m.

The invention is also a recombinant storage battery comprising a plurality of electrodes in a closed case, a fibrous sheet separator as described in the preceding paragraph between adjacent ones of the electrodes, and a body of an electrolyte to which the sheet separators are inert is absorbed by each of the separators and maintained in contact with the adjacent ones of the electrodes.

The invention is also a method for producing a recombinant storage battery. The method comprises the steps of assembling a plurality of electrodes with a sheet separator as described above between adjacent ones of the electrodes in a case having an opening in at least one wall, introducing a quantity of an electrolyte sufficient to cover the electrodes into the case, removing electrolyte that is not absorbed by the sheet separators, the plates, and other internal surfaces that are wetted by the electrolyte, and closing the case. If desired, the case can be evacuated partially before the electrolyte is introduced; in fact, this is usually desirable to increase the rate at which the cells are filled. In a preferred embodiment of the method, the battery is formed while the electrolyte covers the electrodes. In another preferred embodiment a portion of the electrolyte that is not retained by the separators, the plates and the internal surfaces that are wetted is left in the case, or all the electrolyte that is not retained is removed, and a desired amount of electrolyte is introduced before the case is closed so that, in either case, the battery contains absorbed electrolyte and a sump of electrolyte that is not absorbed. The electrolyte sump can be relatively small or relatively large, which is preferred depending upon the service for which the battery is intended.

Finally, the invention is also a recombinant battery having an opening that is closed by a comparatively thin film of polyethylene, polypropylene, or other material that is more pervious to hydrogen than to oxygen. It has been found that the gas which necessitated the vents disclosed by McClelland et al. was mainly hydrogen and oxygen produced by electrolysis of water. It has also been found that the hydrogen is usually present in substantially greater than the stoichiometric proportion as a consequence of reaction of oxygen at the negative electrode, and that excess hydrogen can be vented through a thin film of polyethylene, polypropylene, or the like, in effect, removing water from the electrolyte until the recombination capability increases to such an extent that the excessive release of hydrogen ceases, and recombination prevents excessive pressure build-up. It has also been found that recombinant batteries having plate separators according to the invention are much less subject to hydrogen accumulation in service, even in the presence of free, unabsorbed electrolyte, than were previously known recombinant batteries, and that recombination occurs at an adequate rate in batteries with the instant separators from the very beginning of service, without any need for drying to increase recombination capability.

DESCRIPTION OF THE PREFERRED EMBODIMENTS

Figure 1:
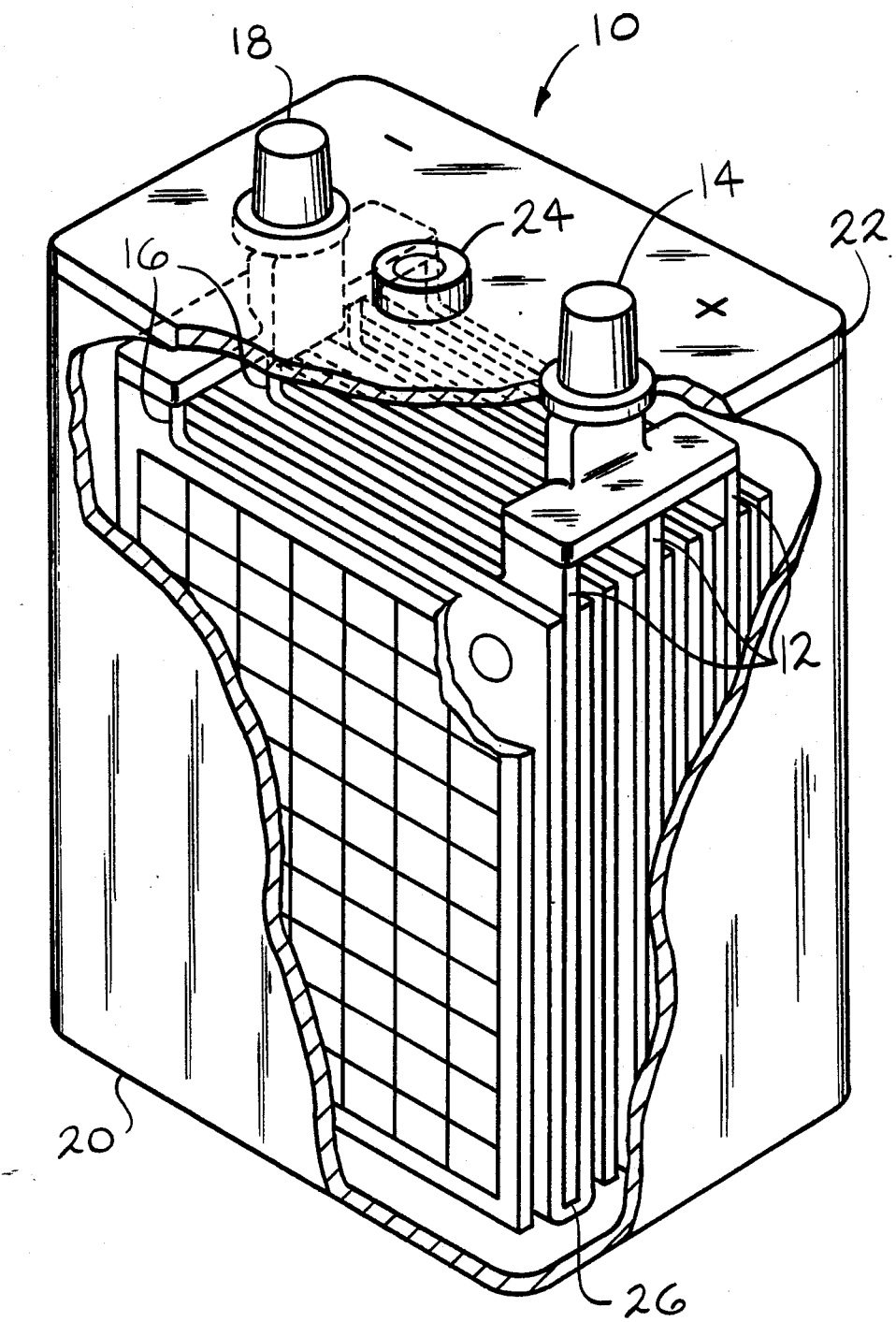
FIG. 1 is a perspective view, partially broken away, of a battery including separator material according to the invention.

With reference to FIG. 1, a single cell battery with a total of seven plates is indicated generally at 10. The battery 10 comprises three positive plates 12 which are electrically connected to a positive terminal 14 and four negative plates 16 electrically connected to a negative terminal 18. The plates 12 and 16 are housed within a battery case 20 which is covered by a top 22. An opening is defined in the top 22 by a boss 24. Separators 26 are positioned between each positive plate 12 and each negative plate 16. The separators 26 comprise sheets of separator material that are wrapped around the bottom of each positive plate 12 and cover both faces of each positive plate 12.

Figure 2:
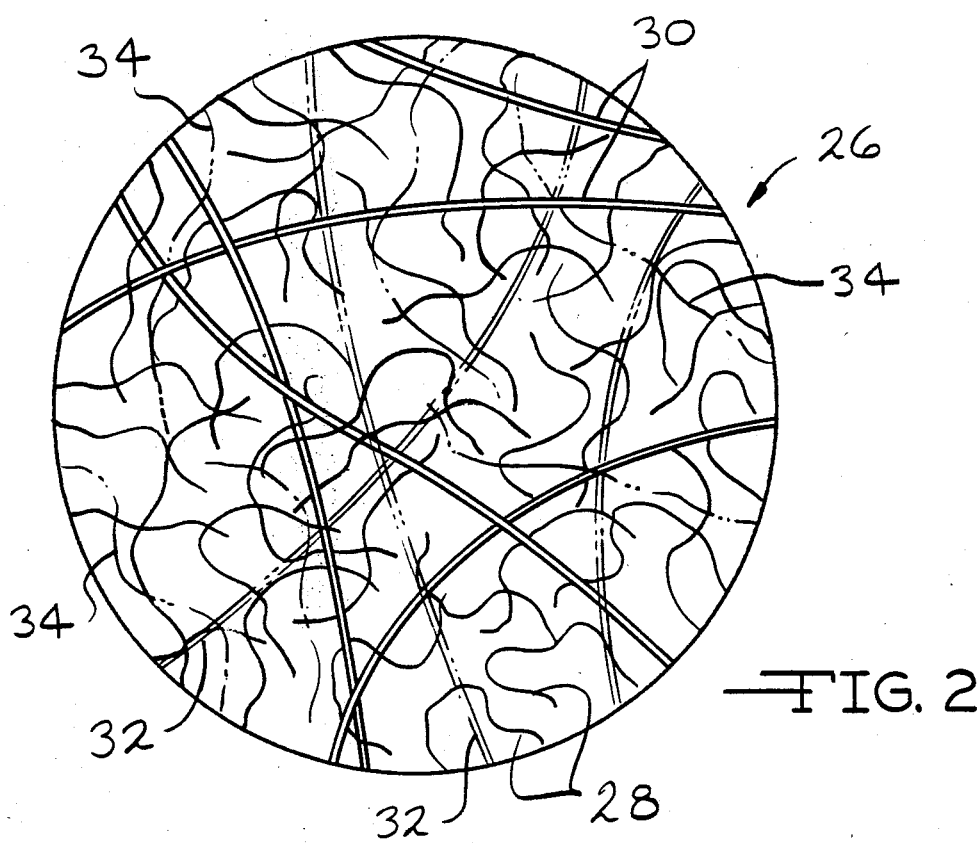
FIG. 2 is an enlarged schematic representation of a portion of the separator material in the battery illustrated in FIG. 1.

Referring now to FIG. 2, the constituents of a separator 26 are schematically represented. The separator material comprises first fibers 28 which have an absorbency (as defined hereinbelow) for electrolyte which is high, i.e., greater than 90 percent, and further comprises second fibers 30 which have an absorbency for electrolyte which is low, i.e., less than 80 percent. The first and second fibers are combined in proportions which give the separator 26, when surfactant free, an absorbency with respect to an electrolyte of from 75 percent to 95 percent. Third fibers 32 (shown in phantom lines) comprising relatively large diameter glass fibers may be incorporated in the separator 26 to increase the resiliency thereof. Additional fibers 34 (shown in phantom lines) can be incorporated in the separator so long as the absorbency of the separator 26, when surfactant free, relative to an electrolyte is from 75 percent to 95 percent.

A method according to the present invention for producing a recombinant battery comprises the steps of filling the battery case 20 containing the plates 12 and 16 and the separators 26 with a quantity of electrolyte sufficient to immerse the plates 12 and 16 and the separators 26, forming the battery 10 by charging, dumping excess electrolyte and sealing the battery case 20 by inserting a cap (not shown) into the opening defining by the boss 24 to close the battery 10. As demonstrated in the examples which follow, the invention is readily applied to multiple cell batteries.

The invention will be more fully understood from the following examples, which are presented solely for the purpose of illustrating and disclosing, and are not to be construed as limiting.

EXAMPLE 1

A fibrous sheet plate separator material was produced from 5 parts Grade 210 glass fibers, 2 parts Grade 206 glass fibers, 1 part Grade A-20BC chopped glass strand, 0.7 part Grade A-121 polyethylene fibers and approximately 0.06 part sulfuric acid, specific gravity 1,835, to lower the pH of a slurry that is produced to about 3. The glass fibers used are all commercially available from Manville; the grade 206 and the grade 210 fibers are marketed under the trade designation TEMPSTRAN for use in producing battery separators. They are made from an acid resistant borosilicate glass. The grade 206 fibers have a surface area of 1.80 $m^2$ per g, a fiber diameter of 0.85 $\mu$m. The grade 210 fibers have a surface area of 0.47 $m^2$ per g, a fiber diameter of 3.25 $\mu$m. The polyethylene fibers used are commercially available from hercules under the trade designation PULPEX A-121. They have an average length from 0.6 to 1.2 mm, maximum 2.0, and an average diameter from 10 to 20 $\mu$m.

The glass and polyethylene fibers, the sulfuric acid and about 250 parts water were charged to a papermaking pulper, and the charge was beat for about 5 minutes to disperse the fibers without causing breakage. The resulting dispersion was diluted with about 250 parts water, and the diluted dispersion was then pumped to a chest at the head of a Fourdrinier paper making machine and flowed onto the screen of the machine to produce a separator material having a basis weight of 200 g per $m^2$.

A Group 26 battery was built with 13 plates per cell consisting of 7 negative plates and 6 positive plates having cast grids containing approximately 0.4 percent tin and 0.07 percent calcium, balance lead. Each plate was 5.625 inches wide and 4.75 inches tall. The positive plates were 0.057 inch thick, while the negative plates were 0.051 inch thick. Sheets of separator material produced as described above, 10.5 inches long and 6.22 inches wide, were folded around the positive plates so that the fold was at the bottom of the plate, leaving separator material extending about ½ inch above the positive plates and about 0.3 inch beyond each side of the positive plates. Each stack of 13 plates with the separator material between adjacent plates was inserted into a cell having a rib-to-rib dimension of 1.184 inches, so that each layer of separator material was compressed to 0.040 inch between plates. The assembly was completed by making the intercell connections and sealing a cover on the battery container. The cells were filled with a sulfuric acid electrolyte to a level about one inch above the tops of the plates. The electrolyte was made by adding 15 g/l sodium sulfate to sulfuric acid which had a specific gravity of 1.235. The battery was then formed; excess electrolyte was dumped; and the battery was sealed.

EXAMPLE 2

A battery was produced by the procedure of Example 1, except that the charge to the pulper was 5.5 parts Grade 210 glass fibers, 3.5 parts Grade 206 glass fibers, 1 part A-20BC chopped glass strand, 0.06 part sulfuric acid and 250 parts water.

EXAMPLE 3

A battery was produced by the procedure of Example 2, except that negative plates having expanded metal grids were used.

For purposes of comparison, but not according to the instant invention, a control battery was produced by the procedure of Example 1, except that the charge to the pulper was 5 parts Grade 210 glass fibers, 2.5 parts Grade 206 glass fibers. 0.06 part sulfuric acid and 250 parts water.

Average values were determined for batteries produced by the foregoing procedures of dry battery weight in g, drained battery weight in g, acid retained in g, acid absorbed by plates in g, acid retained by separators in ml, total separator volume in ml (calculated from the known dimensions), separator void volume in ml (calculated from the total separator volume and the calculated volumes of the fibers in the separator material) and percent v/v unfilled voids in the separator. These average values are set forth in the following table.

|  | Example Number | | | |
|---|---|---|---|---|
|  | 1 | 2 | 3 | Control |
| Dry Battery weight | 11,716 | 11,716 | 10,957 | 11,736 |
| Drained Battery weight | 14,414 | 14,335 | 13,977 | 15,107 |
| Acid Retained | 2,794 | 2,618 | 3,020 | 3,371 |
| Acid Absorbed by Plates | 1,141 | 1,143 | 1,243 | 1,232 |
| Acid retained by Separators | 1,272 | 1,165 | 1,377 | 1,600 |
| Total Separator volume | 1,648 | 1,666 | 1,652 | 1,678 |
| Separator void volume | 1,523 | 1,533 | 1,527 | 1,540 |
| Percent v/v unfilled voids | 16.5 | 24.0 | 10.5 | 0.0 |

Referring to the foregoing table, the term "absorbency", as used herein and in the appended claims, is expressed in percent, is determined by the procedure described above, and is 100 minus the percent v/v unfilled voids.

Batteries produced as described in Example 1 have been field tested in automotive service. They perform satisfactorily without excessive venting of gas, and without excessive pressure build up, indicating that oxygen formed at the positive plates is able to migrate through the separators to the negative plates for electrolytic recombination. Batteries produced by the control method, however, have been found to be unsatisfactory. There is an excessive pressure build-up, requiring that gas be vented and indicating that oxygen is not able to migrate through the separators to the negative plates. Actual test data from field testing of batteries produced as described in Example 1 indicate that they ca be used with computer controlled alternators which, in normal operation, subject the battery to highcurrent charging during braking; although there may be some gas build-up as a consequence of such charging, excessive pressures should not develop, and recombination should occur quickly once the high current charging ceases. Batteries according to the invention can be operated in any position and can be built in many shapes that were not feasible with conventional batteries. There is significantly less explosion hazard with batteries according to the invention than with conventional batteries that are not recombinant.

Batteries produced as described in Examples 1, 2 and 3 and control batteries have been tested to compare the rates at which oxygen gas released at the positive plates was recombined at the negative plates. The test involved charging electrolyte-flooded, six-cell batteries for 16 hours at a constant voltage of 13.8 volts. During charging, a water bath was used to maintain the battery temperatures at 11°. The charging current was measured at the end of the 16 hour charging period. The majority of the free electrolyte in the batteries was then drained quickly, leaving only the small amount of unabsorbed electrolyte that was trapped within cavities in the cover and wetting the surfaces of the internal cell parts. The drained batteries were then sealed, fitted with pressure relief valves and again charged for 16 hours at 13.8 volts and 11°. The charging current was also determined at the end of the second 16 hours of charging. The term "Recombination Current" is subsequently used herein to mean the charging current at the end of the second 16 hours of charging minus that at the end of the first 16 hours of charging. The Recombination Current is related to the sum of the rate at which oxygen gas is being released at the positive plates and the rate at which oxygen gas is being recombined at the negative plates. Average values of Recombination Current are given in the following table for batteries produced as described in Examples 1-3 and for control batteries.

|  | Recombination Current, milliamperes |
|---|---|
| Example 1 | 87 |
| Example 2 | 99 |
| Example 3 | 92 |
| Control | −7 |

The test described above for determining Recombination Current and the data in the foregoing table give a qualitative indication that batteries produced in accordance with the instant invention exhibit far better recombination performance than the Control battery. However, that test does not take into account the effect of the partial pressure of oxygen on recombination.

Accordingly, an additional test was performed on the batteries produced in accordance with the foregoing examples to provide a more nearly quantitative measure of the performance of the batteries in terms of recombination. It has been observed that the rate of recombination of oxygen in a battery is a direct function of oxygen partial pressure in the battery case.

In accordance with the test, a charging voltage is applied to a fully charged battery while a stream of nitrogen is caused to flow therethrough in contact with the plates, separator and electrolyte. The current drawn by the battery is measured. The stream of nitrogen virtually precludes recombination because oxygen must be available in order for recombination to occur. When the partial pressure of oxygen in a battery case drops to zero, so does the rate of recombination.

After the current drawn by the battery under the flow of nitrogen is measured, the nitrogen stream is replaced with air and the charging voltage is again applied to the battery, and the current drawn by the battery is measured again. The difference between the two measurements is referred to hereafter as the "Recombining Current". A Recombining Current of zero occurs when oxygen is not being recombined. Five batteries produced in accordance with the procedure of Example 2 were found to have an average Recombining Current of 138 milliamperes.

EXAMPLES 4A AND 4B

Batteries were produced by the procedure of Example 1, except that the charge to the pulper was 386 kg of a mixture comprising 64 percent Grade 210 glass fibers, 26 percent Grade 206 glass fibers, 5 percent A-20BC chopped glass strand and 5 percent A-121 polypropylene fibers, 22,609 kg of water, and sulfuric acid in an amount sufficient to lower the pH of the charge to approximately 2.6. In the case of Example 4a, the basis weight of the separator material was 220 g per m² and in the case of Example 4b, the basis weight of the separator material was 200 g per m².

Values were determined for two batteries produced by the procedure of Example 4 of dry battery weight in g, drained battery weight in g, acid retained in g, acid absorbed but plates in g, acid retained by separators in ml, total separator volume in ml (calculated from the known dimensions), separator void volume in ml (calculated from the total separator volume and the calculated volumes of the fibers in the separator material) and percent v/v unfilled voids in the separator. These values are set forth in the following table.

|  | Example Number | |
| --- | --- | --- |
|  | 4a | 4b |
| Dry Battery weight | 11,757 | 11,741 |
| Drained Battery weight | 14,617 | 14,564 |
| Acid Retained | 2,860 | 2,823 |
| Acid Absorbed by Plates | 1,061 | 1,062 |
| Acid retained by Separators | 1,410 | 1,380 |
| Total Separator volume | 1,680 | 1,674 |
| Separator void volume | 1,532 | 1,540 |
| Percent v/v unfilled voids | 8.0 | 10.4 |

The Recombining Current was determined for batteries produced as described in Examples 4a and 4b at several different electrolyte volumes. Just before these determinations were made, the batteries were refilled with electrolyte so that the plates in each cell were submerged; the excess electrolyte was then dumped, and a first determination of the Recombining Current was made. Next, several additions of electrolyte were made to each battery, and second and subsequent determinations of Recombining Current were made, one after each addition. It will be appreciated that the first determinations of Recombining Current were made when the plates and the separator materials were saturated with electrolyte and that the second and subsequent determinations were made when there was excess electrolyte beyond that required to saturate the plates and the separator materials. The Recombining Current for each of these tests is set forth in the following table, together with the amount (if any) of electrolyte added after the excess was first dumped:

|  | RECOMBINING CURRENT (milliamperes) | |
| --- | --- | --- |
| Electrolyte added to Each Cell (ml) | Battery of Example 4a | Battery of Example 4b |
| 0 | 549 | 498 |
| 10 | 226 | — |
| 20 | 124 | — |
| 25 | — | 160 |
| 30 | 64 | — |
| 40 | 8 | — |
| 50 | 3* | 11 |
| 75 | — | −7* |

*Since the test is accurate to only about ±4 milliamperes, these values probably should be considered to be zero.

The batteries of Examples 4a and 4b exhibited recombining currents of 549 and 498 milliamperes, respectively, after they were filled with electrolyte so that the plates were submerged and the excess electrolyte was dumped. They continued to exhibit substantial recombining currents even after the electrolyte level was increased beyond the amount that the plates and the separators could hold.

For purposes of comparison, but not in accordance with the instant invention, Recombining Current was measured on several batteries, some made from separator material which is currently in commercial use, and some that are commercially available recombinant batteries. The purpose of the test was to evaluate the necessity for using what McClelland et al. calls a "starved amount" of electrolyte in recombinant batteries containing conventional separator material. In some cases the batteries tested contained separator material composed of 65 percent of Grade 210 fibers and 35 percent of Grade 206 fibers; in other cases the batteries were commercially available, made with separator material which is believed to have been composed of 60 to 65 percent of Grade 210 fibers and 35 to 40 percent of Grade 206 fibers. All of the batteries tested contained a conventional sulfuric acid electrolyte containing about 1 percent of sodium sulfate. The amount of electrolyte in the batteries varied from 87.9 to 100 percent of the amount required to fill the voids in the plates and the separators. The amount of electrolyte required to fill the voids was calculated from available data about the absorptiveness of the separator material and the plates. In other words, at 100 percent, the separator material and the plates were saturated but there was no excess electrolyte in the cells of the battery. The data concerning electrolyte levels and recombining currents is set forth below:

| ELECTROLYTE LEVEL percent v/v of plate and separator saturation | RECOMBINING CURRENT milliamperes |
| --- | --- |
| 100 | 0 |
| 98.4 | 88 |
| 97.2 | 229 |
| 94.9 | 760 |
| 92.6 | 749 |
| 90.2 | 1078 |
| 87.9 | 1591 |

The data in the table above demonstrates that the quantity of electrolyte in each cell of a recombinant battery with conventional separator material is critical with respect to the rate of recombination. Indeed, as the quantity of electrolyte in each cell of such a battery approaches 100 percent of the amount which would saturate the separator material and the plates, the rate of recombination approaches zero. In contrast, as shown by the data set forth in respect of the batteries produced in accordance with the procedure of Example 4, recombination occurs at a relatively rapid rate even when the electrolyte level in each cell exceeds the amount corresponding with 100 percent saturation of the plates and the separator material.

The excessive pressure build-up of control batteries can be relieved by vents of the kind disclosed by McClelland et al. or, according to another aspect of the instant invention, by assembling the battery so that a comparatively thin film of polyethylene, polypropylene, or the like is the only closure for an opening through the case. Such a film, because polyethylene and polypropylene are pervious to hydrogen to a much greater extent than they are pervious to oxygen, enables the preferential release of hydrogen from the interior of the battery, discharging the battery. This preferential release of hydrogen continues until an electrochemical balance is reached, after which time the excessive release of hydrogen, oxygen or both stops. It has been found that a vent opening having an area of 65 cm$^2$ closed by a polyethylene film 0.025 mm thick is capable of preferential venting of hydrogen as required from a 40 ampere hour control battery in ordinary automotive service.

It will be appreciated that various changes and modifications can be made from the detailed description herein without departing from the spirit and scope of the invention as defined in the following claims.

I claim:

1. As a battery plate separator, a fibrous sheet consisting essentially of first fibers which are inert to a particular aqueous electrolyte and which impart to the sheet a given absorbency greater than 90 percent relative to that electrolyte when surfactant-free and second fibers which are inert to that electrolyte and which impart to the sheet a different absorbency less than 80 percent relative to that electrolyte when surfactant-free, the first and second fibers being present in such proportions that the sheet has an absorbency with respect to that electrolyte, when surfactant-free, of from 75 to 95 percent.

2. As a battery plate separator, a fibrous sheet as claimed in claim 1 in which the first fibers are glass fibers and the second fibers are fibers of a polymeric material which is hydrophobic relative to the electrolyte, when surfactant-free.

3. As a battery plate separator, a fibrous sheet as claimed in claim 2 in which the second fibers are polypropylene fibers, and which additionally includes such a proportion of glass fibers of so large a diameter that they increase the resiliency of the sheet after it has been compressed.

4. A recombinant storage battery comprising a plurality of electrodes in a closed case, a fibrous sheet plate separator between adjacent ones of said electrodes, and a body of an electrolyte to which said sheet separators are inert absorbed by each of said separators and maintained in contact with each of the adjacent ones of said electrodes, each of said separator sheets comprising first fibers which impart to the sheet a given absorbency greater than 90 percent relative to said electrolyte and second fibers which impart to the sheet a different absorbency less than 80 percent relative to said electrolyte, the first and second fibers being present in such proportions that each of said sheet separators has an absorbency with respect to said electrolyte of from 75 to 95 percent.

5. A recombinant storage battery as claimed in claim 4 wherein the first fibers in each of said sheet separators are glass fibers and the second fibers are fibers of a polymeric material which is hydrophobic relative to said electrolyte.

6. A recombinant storage battery as claimed in claim 5 wherein the second fibers in each of said sheet separators are polyolefin fibers, and wherein each of said sheet separators additionally includes such a proportion of glass fibers of so large a diameter that they increase the resiliency of said separator sheets after they have been compressed.

7. A method of producing a recombinant storage battery, said method comprising the steps of assembling a plurality of electrodes with a fibrous sheet separator between adjacent ones of the electrodes in a case having an opening in at least one wall, introducing into the case a quantity of an electrolyte sufficient to cover the electrodes, removing electrolyte that is not absorbed by the sheet separators from the case, and closing the case, the sheet separators being inert to the electrolyte and comprising first fibers which impart to the sheet a given absorbency greater than 90 percent relative to the electrolyte and second fibers which impart a different absorbency less than 80 percent relative to the electrolyte, the first and second fibers being present in such proportions that the separator sheets have an absorbency with respect to the electrolyte of from 75 to 95 percent.

8. A method as claimed in claim 7 for producing a recombinant storage battery wherein only a portion of the electrolyte that is not absorbed by the separator sheets is removed by the step of removing electrolyte from the case, and the case is closed containing electrolyte that is absorbed by the separator sheets and a sump of electrolyte that is not absorbed.

9. A method as claimed in claim 7 for producing a recombinant storage battery wherein all of the electrolyte that is not absorbed by the separator sheets is removed by the step of removing electrolyte from the case, thereafter a small quantity of the electrolyte is introduced into the case, and the case is closed containing electrolyte that is absorbed by the separator sheets and a sump of electrolyte that is not absorbed.

10. A method as claimed in claim 7 which additionally includes the step of partially evacuating the case before the electrolyte is introduced thereinto.

11. A method as claimed in claim 8 which additionally includes the step of partially evacuating the case before the electrolyte is introduced thereinto.

12. A method as claimed in claim 9 which additionally includes the step of partially evacuating the case before the electrolyte is introduced thereinto.

13. A method as claimed in claim 7 which additionally includes the step of forming the battery after the electrolyte is introduced into the case to cover the electrodes and before the electrolyte that is not absorbed by the sheet separators is removed from the case.

14. A method as claimed in claim 8 which additionally includes the step of forming the battery after the electrolyte is introduced into the case to cover the electrodes and before the electrolyte that is not absorbed by the sheet separators is removed from the case.

15. A method as claimed in claim 9 which additionally includes the step of forming the battery after the electrolyte is introduced into the case to cover the electrodes and before the electrolyte that is not absorbed by the sheet separators is removed from the case.

* * * * *